United States Patent
Oba et al.

(10) Patent No.: US 12,388,382 B2
(45) Date of Patent: Aug. 12, 2025

(54) MOTOR CONTROL DEVICE AND ELECTRIC POWER STEERING DEVICE PROVIDED WITH SAME

(71) Applicant: DENSO CORPORATION, Kariya (JP)

(72) Inventors: Kohei Oba, Kariya (JP); Yosuke Matsuki, Kariya (JP); Ryo Kano, Kariya (JP)

(73) Assignee: DENSO CORPORATION, Kariya (JP)

( * ) Notice: Subject to any disclaimer, the term of this patent is extended or adjusted under 35 U.S.C. 154(b) by 59 days.

(21) Appl. No.: 18/459,958

(22) Filed: Sep. 1, 2023

(65) Prior Publication Data

US 2023/0412099 A1 Dec. 21, 2023

Related U.S. Application Data

(63) Continuation of application No. PCT/JP2022/009028, filed on Mar. 3, 2022.

(30) Foreign Application Priority Data

Mar. 5, 2021 (JP) ................. 2021-035543

(51) Int. Cl.
*H02P 21/10* (2016.01)
*B62D 5/04* (2006.01)
*H02P 21/22* (2016.01)
*H02P 27/06* (2006.01)

(52) U.S. Cl.
CPC ............ *H02P 21/10* (2013.01); *B62D 5/0472* (2013.01); *H02P 21/22* (2016.02); *H02P 27/06* (2013.01)

(58) Field of Classification Search
CPC .......... H02P 21/10; H02P 21/22; H02P 27/06; B62D 5/0472
See application file for complete search history.

(56) References Cited

U.S. PATENT DOCUMENTS

| | | | |
|---|---|---|---|
| 2007/0107973 A1 | 5/2007 | Jiang et al. | |
| 2013/0106329 A1* | 5/2013 | Kato | H02P 21/26 318/400.11 |
| 2021/0214000 A1* | 7/2021 | Miki | H02P 21/06 |

FOREIGN PATENT DOCUMENTS

| | | |
|---|---|---|
| JP | 2003-304697 A | 10/2003 |
| JP | 2006-141095 A | 6/2006 |
| JP | 2019-017218 A | 1/2019 |
| WO | 2010/116769 | 10/2010 |

\* cited by examiner

*Primary Examiner* — Zoheb S Imtiaz

(74) *Attorney, Agent, or Firm* — Maschoff Brennan

(57) ABSTRACT

A field-weakening controller determines a d-axis current command correction value in a field-weakening control according to a voltage of a DC power supply and a voltage amplitude of a voltage command. A d-axis current final value calculator outputs a d-axis current command final value calculated using a d-axis current command value and a d-axis current command correction value. A field-weakening controller has a voltage amplitude command limiter that limits a voltage amplitude command determined based on the power supply voltage. A voltage amplitude command limiter limits the voltage amplitude command to a voltage amplitude command limit value when the motor state quantity, which is correlated with a time rate of change when a sine wave center voltage of the voltage command crosses from negative to positive, is equal to or greater than a predetermined limit start value.

10 Claims, 10 Drawing Sheets

FIRST EMBODIMENT

THIRD EMBODIMENT

MOTOR CONTROL DEVICE AND ELECTRIC POWER STEERING DEVICE PROVIDED WITH SAME

CROSS REFERENCE TO RELATED APPLICATIONS

This application is a continuation application of International Patent Application No. PCT/JP2022/009028 filed on Mar. 3, 2022, which designated the U.S. and based on and claims the benefits of priority of Japanese Patent Application No. 2021-035543 filed on Mar. 5, 2021.

TECHNICAL FIELD

The present disclosure relates to a motor control device and an electric power steering device including the same.

BACKGROUND

Conventionally, a motor control device that performs vector control of a three-phase brushless motor is known.

SUMMARY

An object of the present disclosure is to provide a motor control device that suppresses a generation of sound due to superimposition of a signal on a sine wave voltage in a motor control device that performs field-weakening control by vector control of a three-phase brushless motor.

A motor control device of the present disclosure is applied to a motor drive system in which power from a DC power supply is converted into three-phase AC power by an inverter and supplied to a brushless motor for calculating a sine wave voltage command output to the inverter by vector control. This motor control device includes a torque command/current command converter, a field-weakening controller, a d-axis current final value calculator, and a current controller.

The torque command/current command converter converts an input torque command into a d-axis current command value and a q-axis current command value. The field-weakening controller determines a d-axis current command correction value in a field-weakening control according to a voltage of the DC power supply and a voltage amplitude of the voltage command. The d-axis current final value calculator outputs a d-axis current command final value calculated using the d-axis current command value and the d-axis current command correction value. The current controller performs a feedback control of the d-axis current command final value and the q-axis current command value.

The field-weakening controller has a voltage amplitude command limiter configured to limit a voltage amplitude command determined based on the voltage of the DC power supply. The voltage amplitude command limiter limits the voltage amplitude command to a voltage amplitude command limit value when the motor state quantity, which is correlated with a time rate of change when a sine wave center voltage of the voltage command crosses from negative to positive, is equal to or greater than a predetermined limit start value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
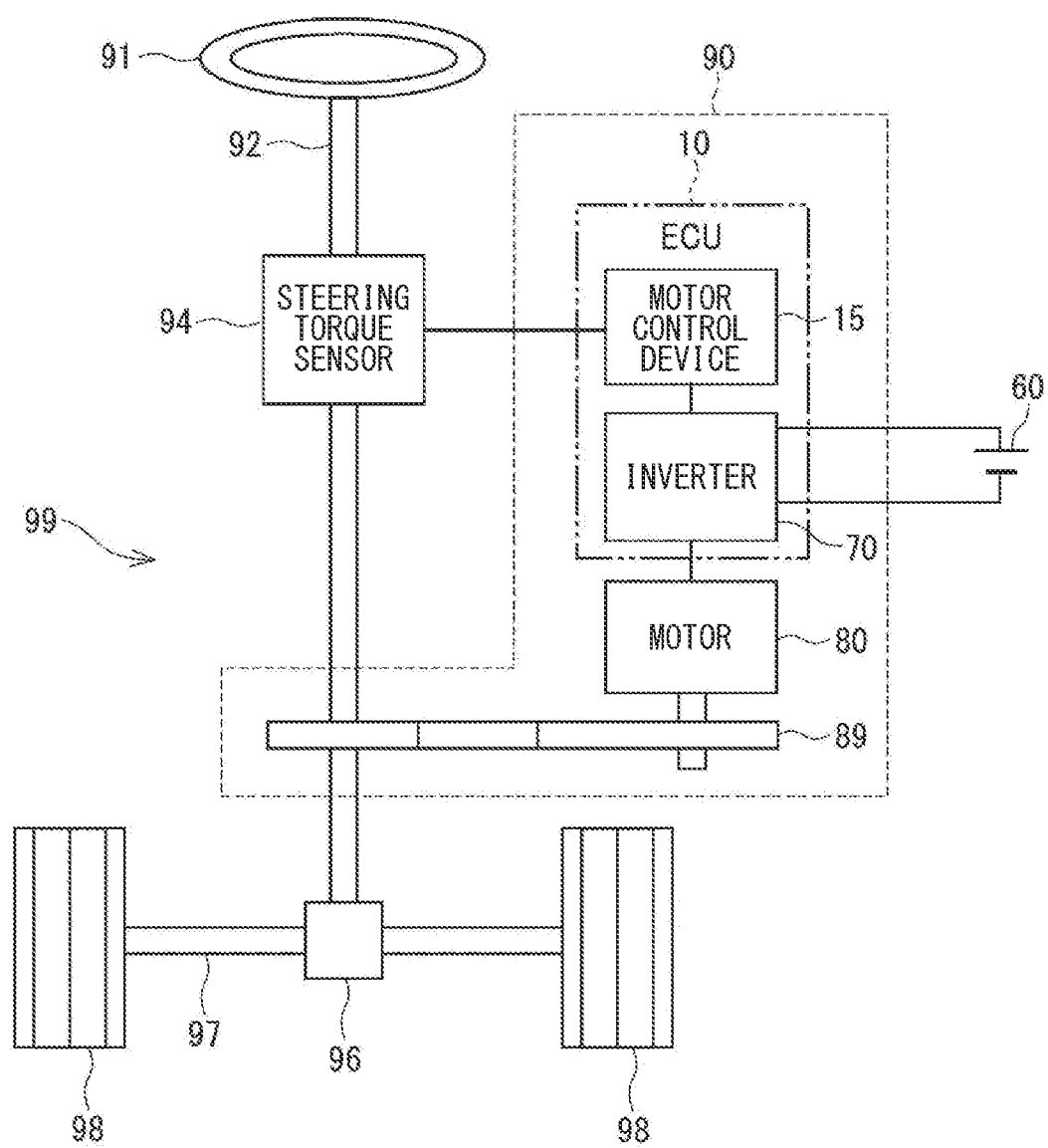
FIG. 1 is a configuration diagram of an electric power steering device to which a motor control device of each embodiment is applied.

In an assumable example, in a motor control device that performs vector control of a three phase brushless motor, in order to prevent the current from becoming difficult to flow in the motor windings due to a counter electromotive force generated at high speed, a technique of performing field-weakening control by passing a negative d-axis current is known. In a control device that controls the drive of a steering assist motor in an electric power steering system, when the d-axis current of field-weakening control flows steeply in order to increase the rotation speed of the motor in response to sudden steering wheel operation, sounds and vibrations that the driver feels uncomfortable may occur. For example, a motor drive control device suppresses the generation of noise and vibration by limiting the change rate of the d-axis current command value during field-weakening control.

When a sine wave voltage is applied to a three-phase brushless motor to perform torque control, the sine wave voltage from an arithmetic unit to an inverter is not a continuous value, but the sine wave voltage is discretely output as values sampled and held in accordance with an update cycle of a calculation period. Due to this output, a signal synchronized with the update cycle of the arithmetic unit is superimposed on the sine wave voltage, affecting the rate of change over time of the sine wave voltage. As a result, current pulsation occurs, which causes noise. The magnitude of this signal increases in proportion to the motor speed and the amplitude of the sine wave voltage and a sound that the driver finds unpleasant is generated.

The technique only focuses on the sudden change in the d-axis current command value, and does not focus on the effect on sound caused by the superimposition of a signal synchronized with the update cycle of the calculation cycle on the sine wave voltage. Therefore, measures against noise during field-weakening control are insufficient.

An object of the present disclosure is to provide a motor control device that suppresses a generation of sound due to superimposition of a signal on a sine wave voltage in a motor control device that performs field-weakening control by vector control of a three-phase brushless motor.

A motor control device of the present disclosure is applied to a motor drive system in which power from a DC power supply is converted into three-phase AC power by an inverter and supplied to a brushless motor for calculating a sine wave voltage command output to the inverter by vector control. This motor control device includes a torque command/current command converter, a field-weakening controller, a d-axis current final value calculator, and a current controller.

The torque command/current command converter converts an input torque command into a d-axis current command value and a q-axis current command value. The field-weakening controller determines a d-axis current command correction value in a field-weakening control according to a voltage of the DC power supply and a voltage amplitude of the voltage command. The d-axis current final value calculator outputs a d-axis current command final value calculated using the d-axis current command value and the d-axis current command correction value. The current controller performs a feedback control of the d-axis current command final value and the q-axis current command value.

The field-weakening controller has a voltage amplitude command limiter configured to limit a voltage amplitude command determined based on the voltage of the DC power supply. The voltage amplitude command limiter limits the voltage amplitude command to a voltage amplitude command limit value when the motor state quantity, which is correlated with a time rate of change when a sine wave center voltage of the voltage command crosses from negative to positive, is equal to or greater than a predetermined limit start value.

Accordingly, in the present disclosure, in a motor control device that performs field-weakening control by vector control of a three-phase brushless motor, it is possible to appropriately suppress the generation of sound due to superimposition of a signal on a sine wave voltage.

A motor control device according to an embodiment of the present disclosure will be described with reference to the drawings. The motor control device of the present embodiment is applied to a motor drive system that drives a steering assist motor in an electric power steering device for a vehicle. In this motor drive system, power from a DC power supply is converted into three-phase AC power by an inverter and supplied to a brushless motor. The motor control device calculates a sine wave voltage command to be output to the inverter by vector control. In the following embodiments, substantially same structural parts are designated with the same reference numerals thereby to simplify the description. The following first to third embodiments are collectively referred to as a present embodiment.

[Electric Power Steering Device]

FIG. 1 shows an overall configuration of a steering system 99 including an electric power steering device 90. Although the electric power steering device 90 shown in FIG. 1 is column assist type, a motor control device 15 may be applied to an electric power steering device of rack assist type. In addition, in FIG. 1, a code "15" of the motor control device of the first embodiment is used. The ECU 10 includes a motor control device 15 and an inverter 70. For example, the ECU 10 is configured integrally with the motor 80.

The steering system 99 includes a steering wheel 91, a steering shaft 92, a pinion gear 96, a rack shaft 97, road wheels 98, an electric power steering device 90 and the like. The pinion gear 96 provided at an axil end of the steering shaft 92 engages with the rack shaft 97. A pair of wheels 98 are provided at both ends of the rack shaft 97. When a driver rotates the steering wheel 91, the steering shaft 92 coupled to the steering wheel 91 rotates. A rotational motion of the steering shaft 92 is converted into a linear motion of the rack shaft 97 by the pinion gear 96, and the pair of wheels 98 are steered at an angle corresponding to a displacement amount of the rack shaft 97.

The electric power steering device 90 includes a steering torque sensor 94, the motor control device 15, the inverter 70, a motor 80, a reduction gear 89, and the like. The steering torque sensor 94 detects the steering torque of the driver. The motor control device 15 calculates a voltage command according to the required torque calculated from information such as the steering torque, and outputs the voltage command to the inverter 70. The inverter 70 converts the power of DC power supply 60 into three-phase AC power based on the voltage command and supplies the three-phase AC power to motor 80. The steering assist torque generated by the motor 80 is transmitted to the steering shaft 92 via the reduction gear 89.

The motor 80 is a three-phase brushless motor. In particular, in a third embodiment, motors having saliency, typified by IPM motors, are controlled. In the first and second embodiments, either an IPM motor or a normal SPM motor may be used with or without saliency.

[Dual Motor Drive System]

Next, with reference to FIGS. 2 and 3, a configuration example of the dual motor drive system will be described. The motor 80 in this motor drive system is a double winding motor having two sets of three phase windings 801 and 802, as shown in FIG. 3. The three phase windings 801 and 802 have the same electrical characteristics and are wound on a common stator while being shifted from each other, for example, by an electrical angle of 30 degrees. According to this configuration, phase currents having the same amplitude and a phase difference of 30 [deg] are supplied to the windings 801 and 802.

Two inverters 701 and 702 provided corresponding to the two sets of windings 801 and 802 supply three-phase AC power to each of the windings 801 and 802. The first inverter 701 is connected to the U1, V1, W1 terminals of the first winding 801. The second inverter 702 is connected to the U2, V2, W2 terminals of the second winding 802.

FIG. 3 shows the configuration of the dual motor drive system 100. A group of components corresponding to the first inverter 701 is referred to as a first system, and a group of components corresponding to the second inverter 702 is referred to as a second system. "1" is added to the end of the code or signal of the components of the first system, and "2" is added to the end of the code or signal of the components of the second system. The two systems are redundantly provided, and if one system fails, the other normal system can continue to drive the motor 80.

The inverters 701 and 702 of each system may be individually connected to two DC power supplies 601 and 602 as indicated by solid lines, or connected in parallel to one DC power supply (for example, 601) as indicated by broken lines. A system configuration in which two systems of inverters 701 and 702 are connected to separate DC power supplies 601 and 602 is called "complete two system". A system configuration in which two systems of inverters 701 and 702 are connected in parallel to a common DC power supply is called a "drive two system". The complete two system can continue to drive the motor even if one DC power supply fails. Hereinafter, FIG. 3 will be described on the assumption that the system configuration is the complete two system.

Since each system has the same configuration, the configuration of the first system will be described as a representative. Regarding the configuration of the second system, the suffix "1" in the description of the configuration of the first system is replaced with "2" and interpreted in the same way. On an input side of inverter 701, a voltage detector 651 for detecting a voltage Vdc1 of DC power supply 601 and a smoothing capacitor 661 for smoothing an input voltage are provided. Hereinafter, the voltage of the DC power supply is referred to as "power supply voltage".

A three-phase current path from the inverter 701 to the motor 80 is provided with a current detector 751 that detects phase currents Iu1, Iv1, and Iw1. Further, in the example of FIG. 3, rotation angle detectors 851 and 852 for detecting the electrical angle of the motor 80 are provided for each system, and detect electrical angles $\theta 1$ and $\theta 2$, respectively. In a configuration used by one rotation angle detector, for example, the electrical angle $\theta 2$ may be calculated as "$\theta 2=\theta 1+30$ [deg]" based on the electrical angle $\theta 1$.

In FIG. 3, the code of the motor control device uses the code "15" of the motor control device of the first embodiment. The motor control device 15 is composed of a microcomputer, a pre-driver, etc., and has a CPU, a ROM, an I/O (not shown), a bus line connecting these components, and the like. The motor control device 15 executes software processing by executing a program stored in advance by the CPU, and control by hardware processing by a dedicated electronic circuit.

The motor control device 15 includes a first system control unit 151 and a second system control unit 152. The configuration of the system control units 151 and 152 of each system corresponds to the configuration of the motor control device 15 of one system shown in FIG. 4. The first system control unit 151 acquires a torque command trq1* shared by the first system out of the required torque. Also, the first system control unit 151 acquires the power supply voltage Vdc1, the phase currents Iu1, Iv1, Iw1, and the rotation angle $\theta 1$ from the voltage detector 651, the current detector 751, and the rotation angle detector 851.

Based on these information, first system control unit 151 calculates a voltage command to be output to the inverter 701 by vector control. The inverter 701 is configured by bridge-connecting switching elements of upper and lower arms of each phase of U-phase, V-phase, and W-phase. The inverter 701 converts the power of DC power supply 601 into three-phase AC power by operating each switching element based on the voltage command, and supplies it to the first winding 801 of the motor 80.

Regarding the components described later with reference to FIG. 4, in two systems of the motor drive system, the motor control device 15 includes two sets of current controllers and two field-weakening controllers corresponding to the two inverters 701 and 702. The two field-weakening controllers each have a voltage command amplitude limiter. Here, voltage amplitude command limit value Vamp*_lim of the first system control unit 151 and thereof the second system control unit 152 are set to the same value. According to this configuration, it is possible to ensure a balance between systems regarding sound suppression. In addition, the first system control unit 151 and the second system control unit 152 basically calculate voltage commands independently based on information for each system. However, if necessary, cooperative control may be performed by communicating information between systems.

[Motor Control Device]

A detailed configuration of the motor control device according to each embodiment that performs field-weakening control by vector control of a three-phase brushless motor will be described in order. First, the technical significance of field-weakening control will be described. When the motor speed is high, the counter electromotive force generated in proportion to the rotor magnet flux and rotation speed becomes larger than the inverter output power. It becomes difficult to generate current in the motor windings. As a countermeasure against this phenomenon, by generating a negative d-axis current so as to weaken the magnet flux, it becomes possible to generate a current even under high rotation conditions.

By the way, when a sine wave voltage is applied to a three-phase brushless motor to perform torque control, the sine wave voltage from an arithmetic unit to an inverter is not a continuous value, but the sine wave voltage is discretely output as values sampled and held in accordance with an update cycle of a calculation period. Due to this output, a signal synchronized with the update cycle of the arithmetic unit is superimposed on the sine wave voltage, affecting the rate of change over time of the sine wave voltage. As a result, current pulsation occurs, which causes noise. The magnitude of this signal increases in proportion to the motor speed and the amplitude of the sine wave voltage and a sound that the driver finds unpleasant is generated.

Therefore, in the motor control device of the present embodiment, an object of the present disclosure is to suppress noise caused by superimposition of a signal synchronized with an update cycle of a calculation cycle on a sine wave voltage in field-weakening control. A functional unit that calculates a voltage command in the motor control device corresponds to the above-described "arithmetic unit". Since sound and vibration, which are wave phenomena, are often discussed together, "sound" in the above problem may be replaced with "sound and vibration." However, the phenomenon that the driver feels uncomfortable is mainly a sound such as a mosquito noise, and the main purpose of the present disclosure is to suppress the sound.

Figure 3:
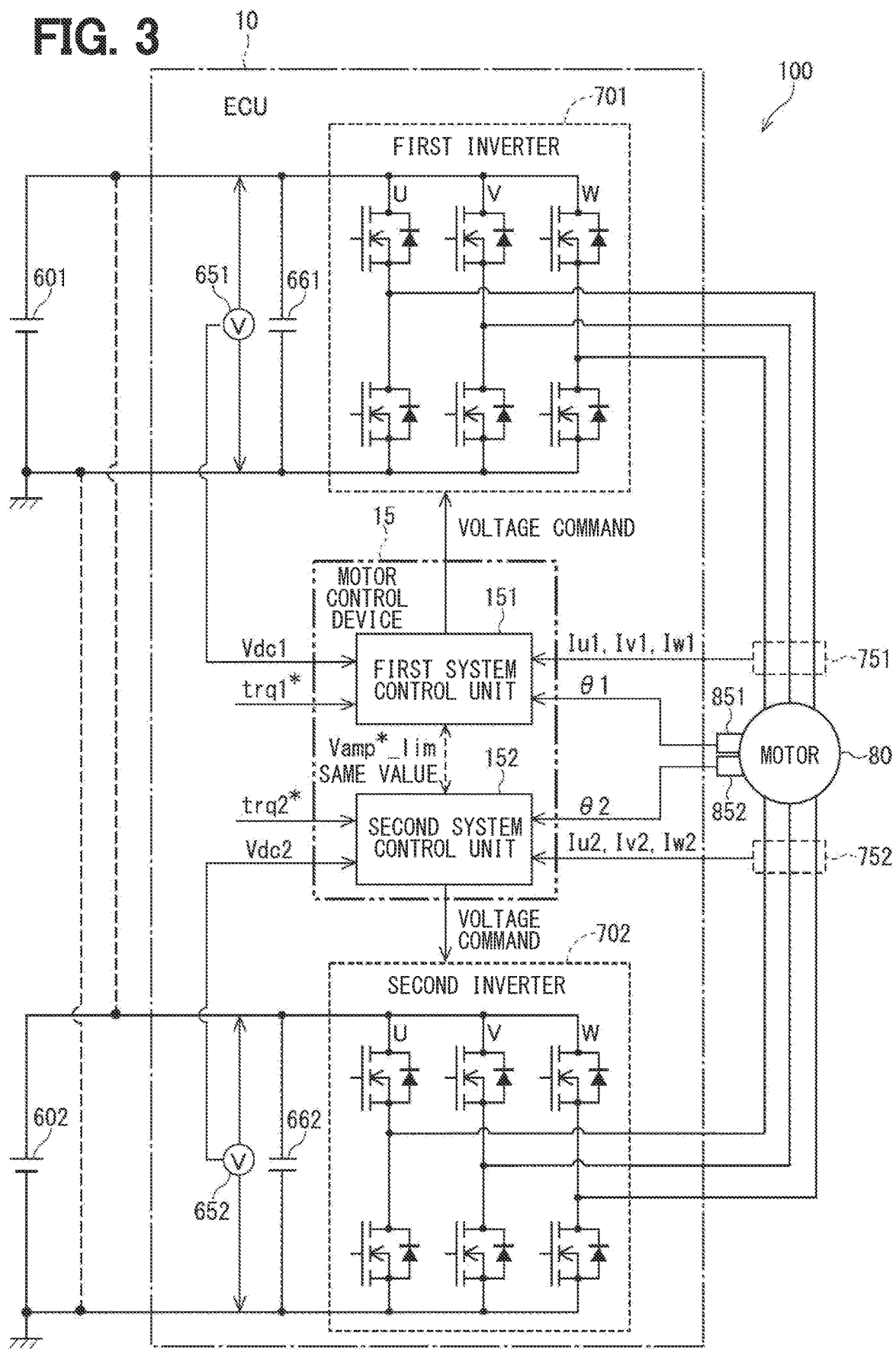
FIG. 3 is a configuration diagram of a dual motor drive system.
Figure 4:
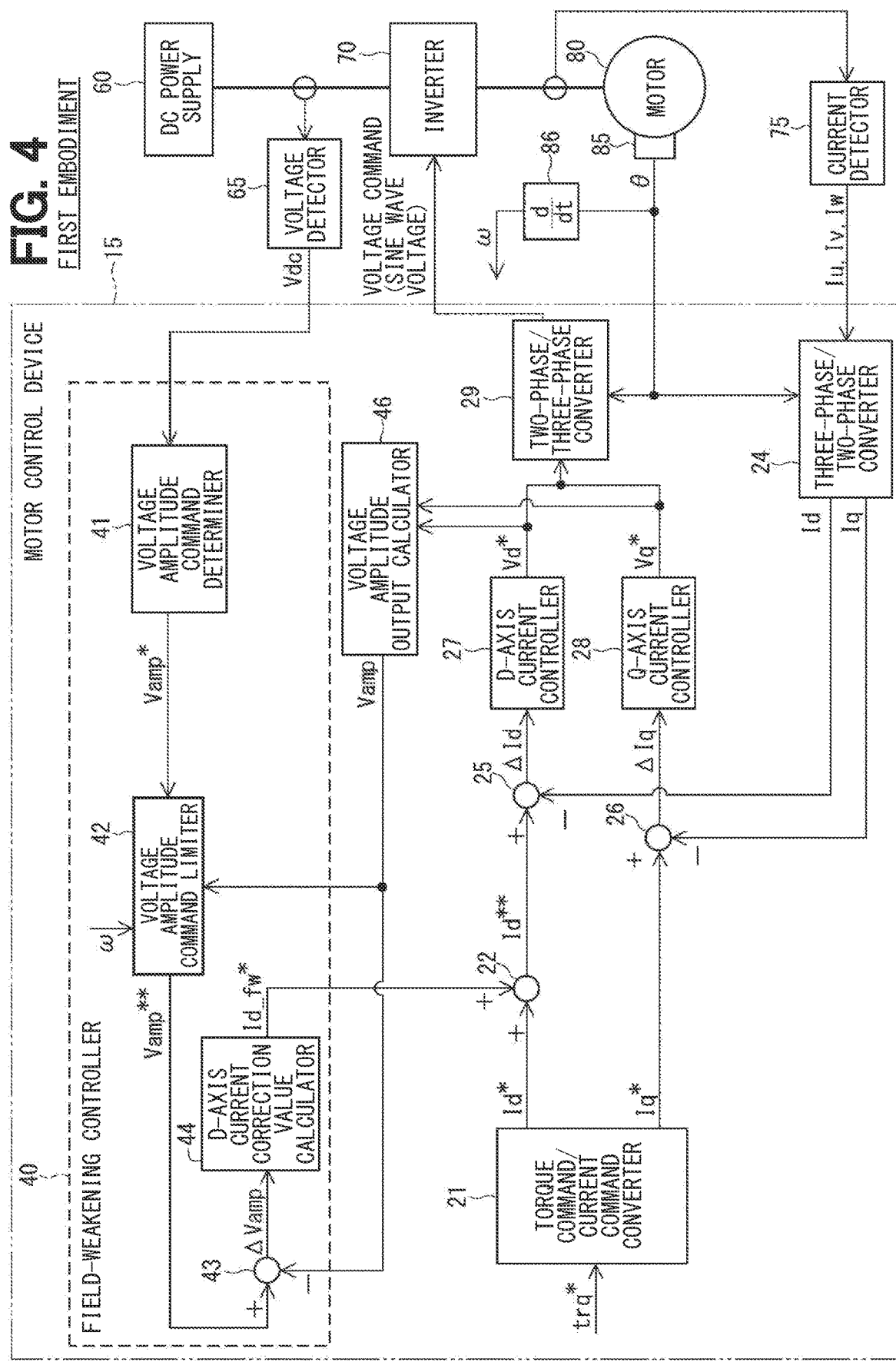
FIG. 4 is a control block diagram of a motor control device of a first embodiment.
Figure 8:
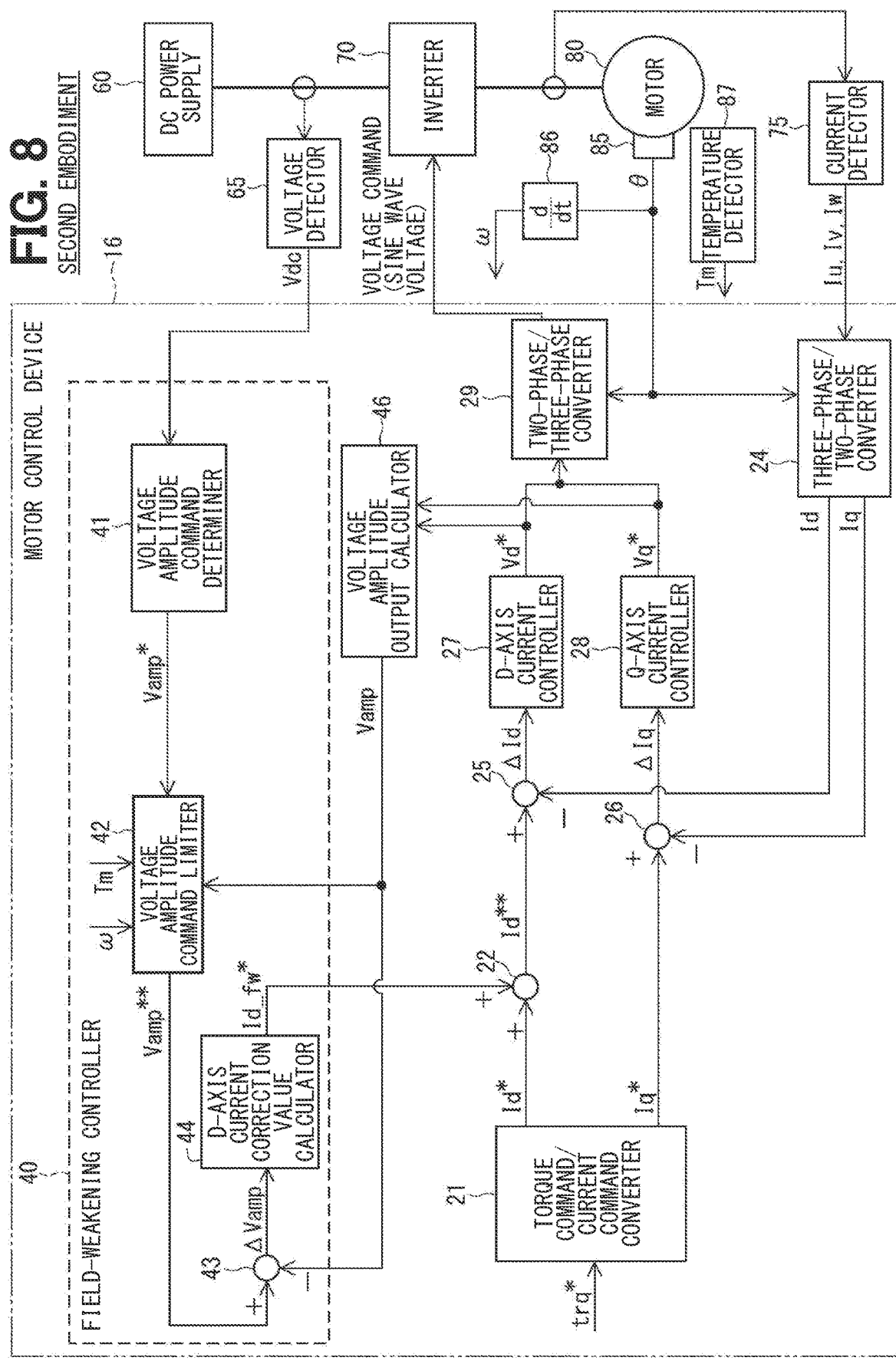
FIG. 8 is a control block diagram of a motor control device of a second embodiment.
Figure 10:
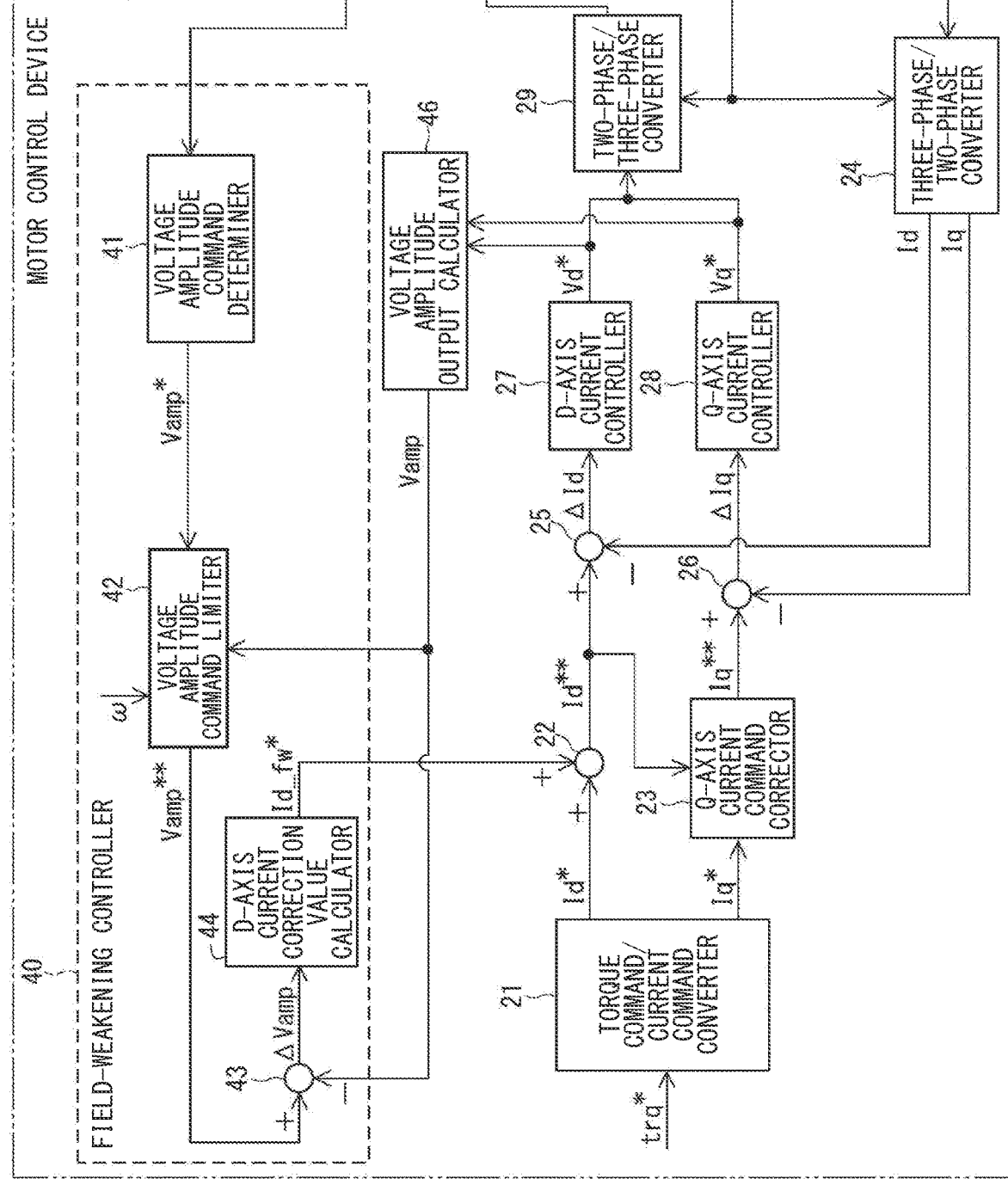
FIG. 10 is a control block diagram of a motor control device of a third embodiment.

The motor control devices 15, 16, and 17 of the first, second, and third embodiments are shown in FIGS. 4, 8, and 10 as being applied to a single motor drive system for the sake of simplicity. The reference numerals of the DC power supply, voltage detector, inverter, current detector, and rotation angle detector of the motor drive system are denoted as 60, 65, 70, 75, 85 by deleting the "1" and "2" at the end of the reference numerals in FIG. 3. The same applies to symbols for the torque command trq*, the power supply voltage Vdc, the three-phase currents Iu, Iv, Iw, and the electrical angle $\theta$. When applied to a two-system motor drive system, it can be interpreted as providing two sets of one-system configurations.

Further, as shown in FIGS. 4, 8 and 10, a differentiator 86 is provided for differentiating the electrical angle $\theta$ detected by the rotation angle detector 85 with respect to time. The differentiator 86 may be provided inside the motor control devices 15, 16, and 17. The differentiator 86 multiplies the electrical angular velocity by a conversion factor and outputs the rotation speed $\omega$ of the motor 80. Hereinafter, "rotation speed $\omega$ of the motor 80" is simply referred to as "rotation speed $\omega$".

In general, ω is used as a symbol representing rotational angular velocity [rad/s], but in this specification, for the sake of convenience, it is referred to as "rotation speed ω", and rotation speed is used in the same sense as rotational angular velocity. In addition, no reference is made to specific rotation speed. For example, when the rotation speed is expressed in units of [rpm], the rotation speed can be calculated by multiplying it by an appropriate conversion factor.

First Embodiment

The configuration of the motor control device 15 of the first embodiment will be described with reference to FIG. 4. The motor control device 15 has configurations for vector control, current feedback control and field-weakening control. First, as a well-known configuration, the motor control device 15 includes a torque command/current command converter 21, a d-axis current final value calculator 22, a three-phase/two-phase converter 24, a d-axis current deviation calculator 25, a q-axis current deviation calculator 26, a d-axis current controller 27, a q-axis current controller 28 and a two-phase/three-phase converter 29.

The torque command/current command converter 21 converts the torque command trq* input from the host control circuit into a d-axis current command value Id* and a q-axis current command value Iq*. The symbol '/' means that the input before the '/' is converted to the output after the '/'. The same applies to the three-phase/two-phase converter 24 and the two-phase/three-phase converter 29.

The d-axis current final value calculator 22 outputs a d-axis current command final value Id** calculated using the d-axis current command value Id* and a d-axis current command correction value Id_fw* calculated by a d-axis current correction value calculator 44 of a field-weakening controller 40. In the configuration example shown in FIG. 4, the d-axis current final value calculator 22 adds the d-axis current command value Id* and the axis current command correction value Id_fw*.

The three-phase/two-phase converter 24 converts the 3-phase currents Iu, Iv, and Iw obtained from the current detector 75 into dq-axis currents Id and Iq using the electrical angle θ. The d-axis current deviation calculator 25 calculates a deviation ΔId between the d-axis current command final value Id** and the fed-back d-axis current Id. The q-axis current deviation calculator 26 calculates a deviation ΔIq between the q-axis current command value Iq* and the fed-back q-axis current Iq.

The current controllers 27 and 28 perform feedback control of the d-axis current command final value Id** and the q-axis current command value Iq*. Specifically, the d-axis current controller 27 calculates the d-axis voltage command value Vd* by PI calculation or the like so that the d-axis current deviation ΔId approaches zero. The q-axis current controller 28 calculates the q-axis voltage command value Vq* by PI calculation or the like so that the q-axis current deviation ΔIq approaches zero.

The two-phase/three-phase converter 29 converts the dq-axis voltage command values Vd* and Vq* into three-phase voltage commands using the electrical angle θ, and outputs the three-phase voltage commands to the inverter 70. A three-phase voltage command for the fixed coordinate system is a sine wave voltage. The calculation of the duty ratio based on the voltage command and generation of the pulse signal by PWM are included in the inverter 70, and detailed description thereof will be omitted.

Further, the motor control device 15 includes the field-weakening controller 40 and a voltage amplitude output calculator 46 as configurations unique to the present embodiment. The field-weakening controller 40 determines a d-axis current command correction value Id_fw* in the field-weakening control according to the power supply voltage Vdc and the voltage amplitude Vamp of the voltage command. The voltage amplitude output calculator 46 calculates the voltage amplitude Vamp of the voltage command by Equation (1) based on the d-axis voltage command value Vd* and the q-axis voltage command value Vq*.

$$V_{amp} = \sqrt{(Vd^{*2} + Vq^{*2})} \quad (1)$$

The field-weakening controller 40 has a voltage amplitude command determiner 41, a voltage amplitude command limiter 42, a voltage amplitude deviation calculator 43 and a d-axis current correction value calculator 44. The voltage amplitude command determiner 41 determines Vamp* based on the power supply voltage Vdc. The voltage amplitude command limiter 42 limits the voltage amplitude command Vamp* determined by the voltage amplitude command determiner 41 according to the "motor state quantity" and outputs a voltage amplitude command Vamp** after limiting.

In the present embodiment, a product of the voltage amplitude Vamp and the rotation speed ω is used as the "motor state quantity". The voltage amplitude command limiter 42 acquires the voltage amplitude Vamp and the rotation speed ω, and limits the voltage amplitude command Vamp* according to the motor state quantity calculated based on them. The "motor state quantity" is an index for relatively comparing a shape of the sine wave voltage, and is defined as "a quantity that correlates with the time rate of change when the sine wave center voltage of the voltage command crosses from negative to positive". The significance of using the product of the voltage amplitude Vamp and the rotation speed ω as the motor state quantity will be described later.

The voltage amplitude command limiter 42 compares the input voltage amplitude command Vamp* with the voltage amplitude command limit value Vamp*_lim, and outputs the smaller value as the after-limiting voltage amplitude command Vamp**. When the Vamp* is smaller than Vamp*_lim ("Vamp*<Vamp*_lim"), the voltage amplitude command limiter 42 outputs the input voltage amplitude command Vamp* as it is according to equation (2.1).

$$V_{amp}** = V_{amp}* \quad (2.1)$$

On the other hand, when Vamp* is equal to, or larger than Vamp*_lim ("Vamp*≥Vamp*_lim"), the voltage amplitude command limiter 42 outputs the voltage amplitude command limit value Vamp*_lim according to equation (2.2).

$$V_{amp}** = V_{amp}*\_lim \quad (2.2)$$

The voltage amplitude deviation calculator 43 calculates a deviation ΔVamp between the after-limiting voltage amplitude command Vamp** and the voltage command Vamp fed back from the voltage amplitude output calculator 46. The d-axis current correction value calculator 44 calculates a d-axis current command correction value Id_fw* by PI calculation or the like so that the voltage command deviation ΔVamp approaches zero.

The motor state quantity will be described with reference to FIG. 5. Four patterns of sine wave voltages <1> to <4> with different amplitudes and frequencies are shown in order from the top of FIG. 5. When the timing at which the voltage crosses the sine wave center voltage (i.e., 0 [V]) from negative to positive is t=0, each sine wave voltage is represented by equation (3), which includes the voltage amplitude Vamp and the frequency f, as a function V(t) of time t. The angle unit in the equation is [rad].

$$V(t) = Vamp \times \sin(2\pi f)t \tag{3}$$

The voltage amplitude Vamp of the reference voltage <1> of the four patterns is defined as A, and $2\pi$ times the frequency f is defined as N. That is, Vamp is equal to A, $2\pi f$ is equal to N, and the voltage <1> is represented by equation (4.1).

$$V1(t) = A \sin Nt \tag{4.1}$$

The voltage <2> is obtained by doubling the voltage amplitude Vamp and halving the frequency f with respect to the voltage <1>. That is, Vamp is equal to 2 A and $2\pi f$ is equal to (N/2). The voltage <2> is represented by equation (4.2).

$$V2(t) = 2A \sin(N/2)t \tag{4.2}$$

The voltage <3> is obtained by equalizing the voltage amplitude Vamp and doubling the frequency f with respect to the voltage <1>. That is, Vamp is equal to A and $2\pi f$ is equal to 2N. The voltage <3> is represented by equation (4.3).

$$V3(t) = A \sin 2Nt \tag{4.3}$$

The voltage <4> is obtained by doubling the voltage amplitude Vamp and equalizing the frequency f with respect to the voltage <1>. That is, Vamp is equal to 2 A and $2\pi f$ is equal to N. The voltage <4> is represented by equation (4.4).

$$V4(t) = 2A \sin Nt \tag{4.4}$$

The motor state quantity is defined as "a quantity that correlates with the time rate of change when the sine wave center voltage of the voltage command crosses from negative to positive". The motor state quantity is a positive value because it is the time rate of change when crossing from negative to positive. In general, the time rate of change at t=0 of the voltage function represented by the equation (1) is represented by the equation (5) by differentiating the equation (3) and substituting 0 for t. A slope of the sine wave at t=0 in FIG. 5 corresponds to this value.

$$(d/dt)V(0) = Vamp \times 2\pi f \times \cos(2\pi f)t = Vamp \times 2\pi f \tag{5}$$

Therefore, the time rate of change of each voltage <1> to <4> at t=0 is represented by equations (6.1) to (6.4). If the shape of the sine wave is the same, the time rate of change at t=0 is the same value regardless of the magnitude of the voltage amplitude.

Voltage <1>: $(d/dt)V1(0) = AN$ (6.1)

Voltage <2>: $(d/dt)V2(0) = AN$ (6.2)

Voltage <3>: $(d/dt)V3(0) = 2AN$ (6.3)

Voltage <4>: $(d/dt)V4(0) = 2AN$ (6.4)

The motor state quantity G is calculated, for example, by multiplying the time rate of change at t=0 by a conversion factor as a quantity correlated with the time rate of change at t=0. When a relationship between the rotation speed $\omega$ and the frequency f is expressed by "$\omega = 2\pi f$", the motor state quantity G is defined by an equation (7) obtained by modifying the equation (5). The symbol "G" of the motor state quantity is derived from gradient.

$$G = Vamp \times 2\pi f = Vamp \times \omega \tag{7}$$

If the limit start value G0 is set in the range of "AN<G0≤2AN", the voltage amplitude command Vamp* is not limited for the voltages <1> and <2>, and the voltage amplitude command Vamp* is not limited for the voltages <3> and <4>. For example, voltage <2> and voltage <4> both have the voltage amplitude of 2 A, but the voltage amplitude command Vamp* of voltage <2>, which has a relatively low rotation speed, is not limited and the voltage amplitude command Vamp* of the voltage <4>, which has a relatively high rotation speed, is limited.

As described above, the field-weakening controller 40 of the present embodiment limits the voltage amplitude command Vamp* when the motor state quantity G is equal to or greater than the limit start value G0, so that the higher the frequency of the voltage command, the more the voltage amplitude is limited. Therefore, in the motor control device that performs field-weakening control, it is possible to suppress the generation of sound caused by the signal superimposed on the sine wave voltage. In particular, the electric power steering device 90 suppresses sounds that the driver finds uncomfortable, thereby improving comfort during driving.

Figure 5:
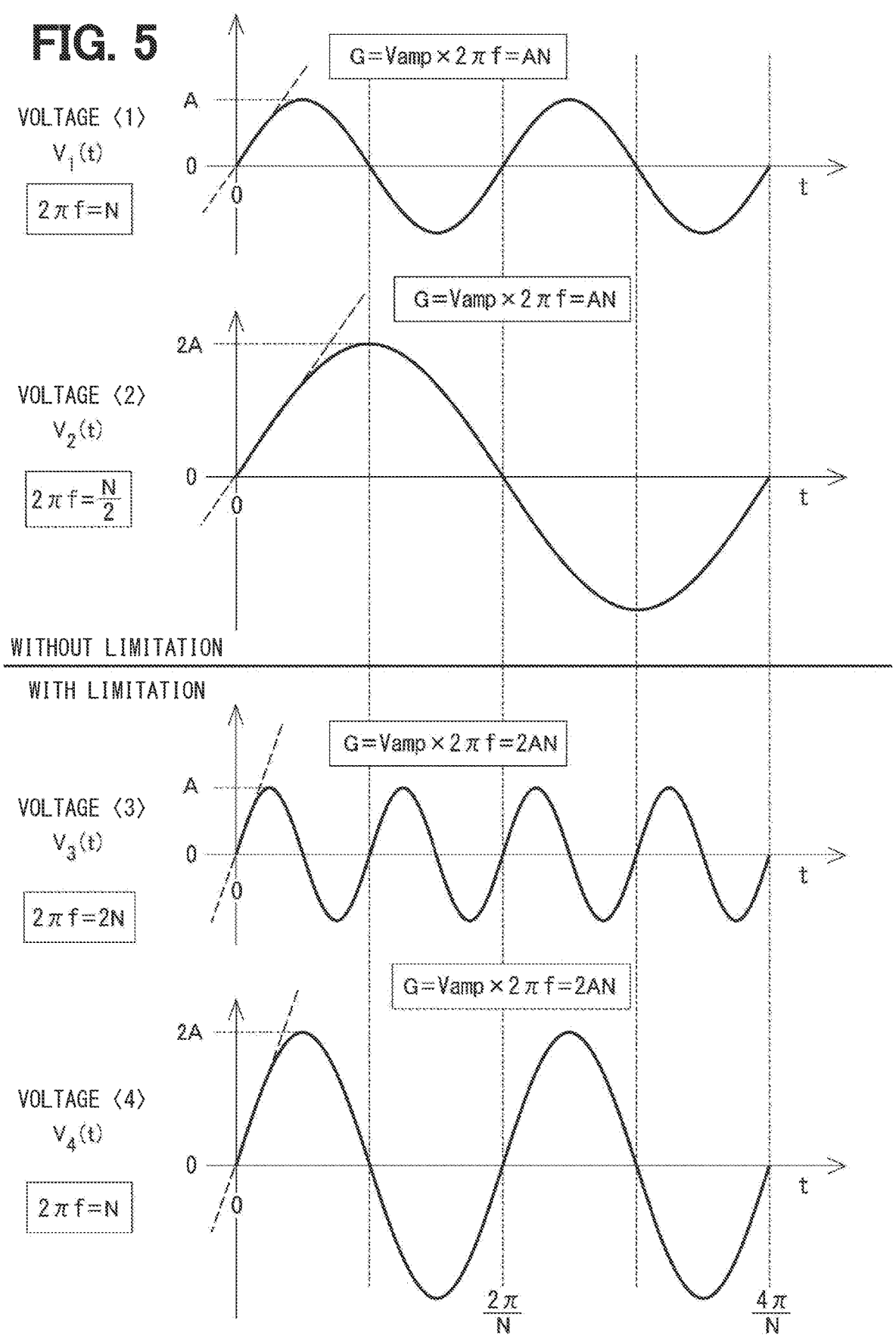
FIG. 5 is a diagram for explaining a rate of change over time of a sine wave voltage, which is a motor state quantity.

Alternatively, the motor state quantity may be obtained by directly detecting the time rate of change of the sine wave voltage at t=0 as shown in FIG. 5. However, by using the information of the voltage amplitude Vamp and the rotation speed $\omega$ that are also used for other purposes, the motor state quantity can be calculated with a simple configuration without requiring a configuration such as a dedicated differentiator.

Figure 6A:
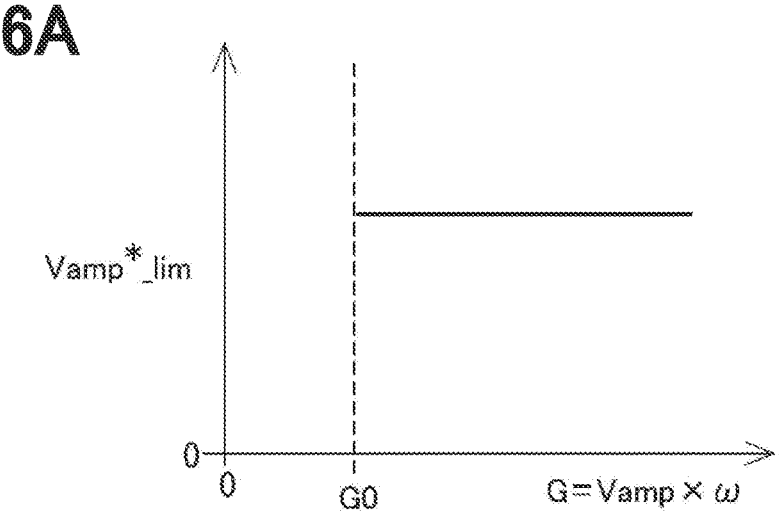
FIG. 6A is an example of a map showing a relationship between (voltage amplitude×motor rotation speed) and a voltage amplitude command limit value.
Figure 6B:
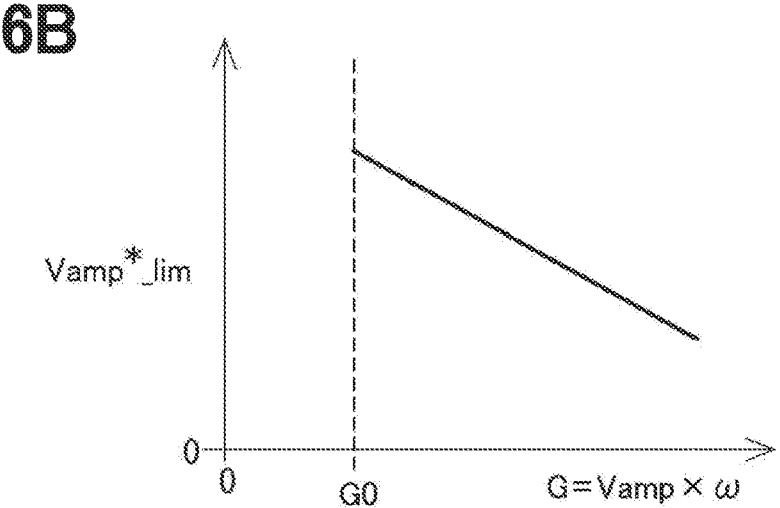
FIG. 6B is another example of a map showing a relationship between (voltage amplitude×motor rotation speed) and a voltage amplitude command limit value.
Figure 6C:
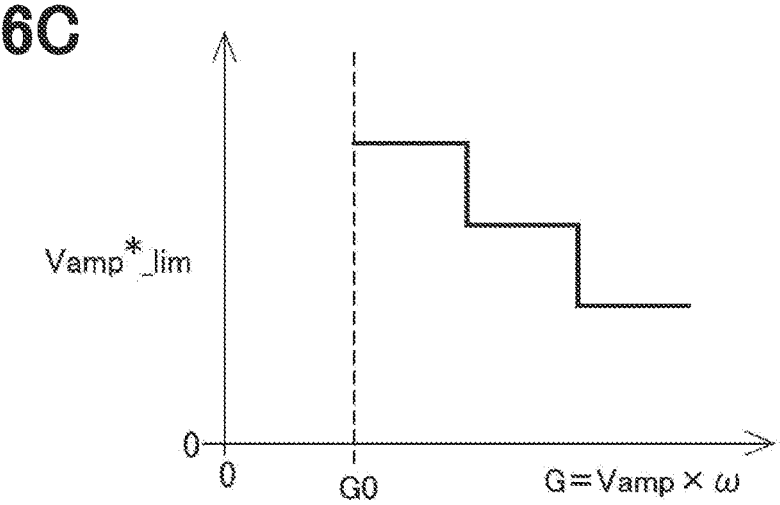
FIG. 6C is another example of a map showing a relationship between (voltage amplitude×motor rotation speed) and a voltage amplitude command limit value.

Next, referring to FIGS. 6A, 6B, and 6C, examples of maps of the motor state quantity G and the voltage amplitude command limit value Vamp*_lim are shown. The horizontal axis of the map represents the motor state quantity G, which is the product of the voltage amplitude Vamp and the rotation speed $\omega$. As common to each map, the voltage amplitude command limiter 42 sets the voltage amplitude command limit value Vamp*_lim when the motor state quantity G is equal to or greater than the limit start value G0.

When the motor state quantity G is equal to 0, that is, when Vamp is equal to 0 or $\omega$ is equal to 0, the motor 80 is stopped and there is no need for limitation. Therefore, the limit start value G0 can be set to a value slightly greater than 0 in the minimum case. In this case, the voltage amplitude command limiter 42 limits the voltage amplitude command Vamp* substantially in all operating states of motor 80. In the example shown in FIG. 6A, the voltage amplitude command limiter 42 sets the voltage amplitude command limit value Vamp*_lim to a constant value when the motor state quantity G is equal to or greater than the limit start value G0. Thereby, the control is simplified and the calculation load can be reduced.

In the example shown in FIGS. 6B and 6C, when the motor state quantity G is equal to or greater than the limit start value G0, the voltage amplitude command limiter 42 sets the voltage amplitude command limit value Vamp*_lim smaller as the motor state quantity G increases. Especially in the example shown in FIG. 6B, as the motor state quantity G increases, the voltage amplitude command limit value Vamp*_lim decreases linearly. In the example shown in FIG. 6C, the voltage amplitude command limit value Vamp*_lim decreases stepwise as the motor state quantity G increases. As a result, the degree of noise suppression can be finely adjusted according to the motor state quantity G.

Figure 7:
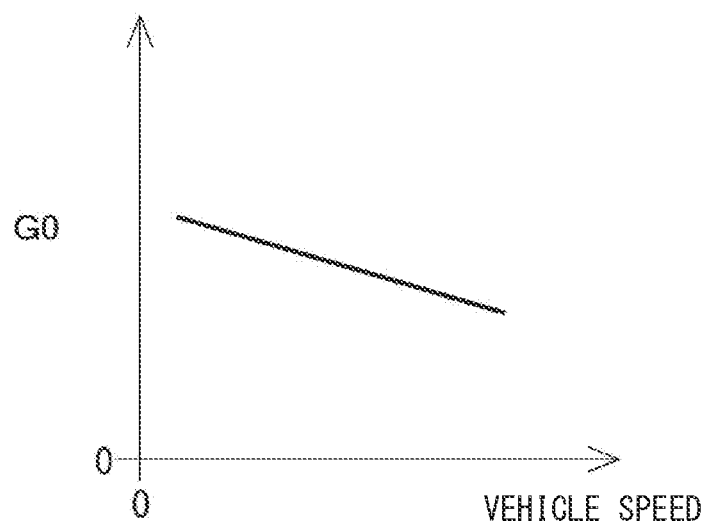
FIG. 7 is an example of a map showing a relationship between a vehicle speed and a restriction start value.

Also, the voltage amplitude command limiter 42 may variably set the limit start value G0 according to information such as the vehicle speed and the angular acceleration of the motor 80. For example, when the vehicle is traveling at low speed, the motor state quantity G tends to increase due to sudden steering or steering with large torque, whereas the motor state quantity G is relatively small when the vehicle is traveling at high speed. Therefore, as shown in FIG. 7, the voltage amplitude command limiter 42 may set the limit start value G0 smaller as the vehicle speed increases.

Second Embodiment

Next, a second embodiment will be described with reference to FIGS. 8 and 9. As shown in FIG. 8, in the second embodiment, the motor drive system is provided with a temperature detector 87 that detects the temperature Tm of the motor 80. The temperature detector 87 is not limited to one that directly detects the temperature, but may be one that calculates the Joule heat generated by energization from the phase current detection value, adds the temperature rise due to the Joule heat to an initial temperature, and estimates the motor temperature Tm. The motor temperature Tm estimated based on the detected value of the current in this way is also interpreted as "the temperature of the motor detected by the temperature detector".

In the motor control device 16 of the second embodiment, the voltage amplitude command limiter 42 further acquires the motor temperature Tm. The voltage amplitude command limiter 42 determines the voltage amplitude command limit value Vamp*_lim according to the motor temperature Tm in addition to the motor state quantity G, which is the product of the voltage amplitude Vamp and the rotation speed ω.

Figure 9:
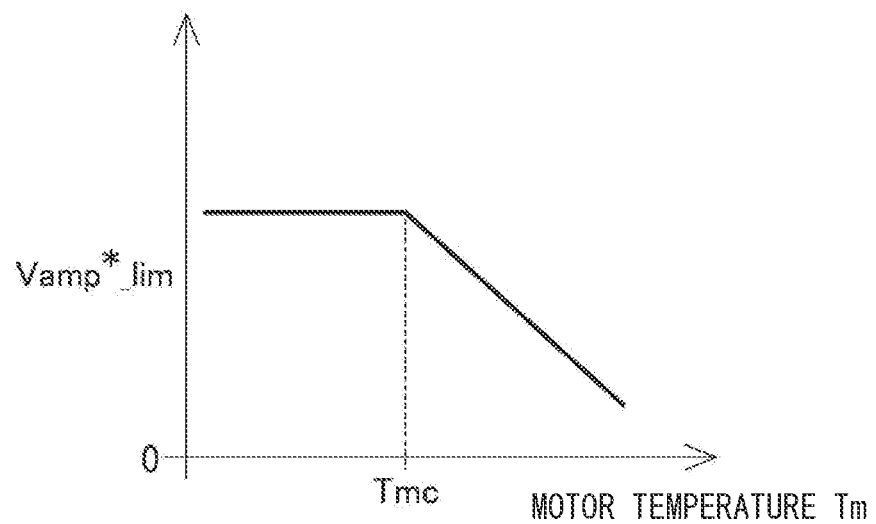
FIG. 9 is an example of a map showing between a motor temperature and a voltage amplitude command limit value.

FIG. 9 shows an example of a map representing a relationship between the motor temperature Tm and the voltage amplitude command limit value Vamp*_lim when the motor state quantity G is fixed. The voltage amplitude command limit value Vamp*_lim is constant in the region where the motor temperature Tm is equal to or lower than a critical temperature Tmc. In the region where the motor temperature Tm exceeds the critical temperature Tmc, the higher the motor temperature Tm, the smaller the voltage amplitude command limit value Vamp*_lim is set. As a result, the motor 80 is protected from heat. Furthermore, temperature characteristics such as magnetic saturation may be considered.

Third Embodiment

Next, a third embodiment will be described with reference to FIG. 10. A motor 80 to be controlled in the third embodiment is a motor having saliency. Since the motor having saliency is mainly IPM motor, it is indicated as "IPM motor 80" in FIG. 10. However, exceptionally, an inset SPM motor in which a permanent magnet having a convex surface on the radially outer side is provided on the rotor surface is included as the motor having saliency. The motor having saliency includes reluctance torque in the motor torque because a d-axis inductance Ld and a q-axis inductance Lq are different in the second term of Equation (8). In Equation (8), p is the number of pole pairs, and p is the counter electromotive force constant.

$$trq = p \times \varphi \times Iq + p \times (Ld - Lq) \times Id \times Iq \quad (8)$$

In addition to the configuration of the motor control device 15 of the first embodiment, the motor control device 17 of the third embodiment further has a q-axis current command corrector 23 between the torque command/current command converter 21 and the q-axis current deviation calculator 26. The q-axis current command corrector 23 corrects the q-axis current command value Iq* according to the d-axis current command final value Id output by the d-axis current command final value calculator 22, and outputs the corrected q-axis current command value Iq.

The q-axis current command corrector 23 corrects the q-axis current command value Iq* in order to compensate for the torque change in equation (8) due to the limitation of the d-axis current command value Id* calculated by the torque command/current command converter 21. For example, the q-axis current command corrector 23 has a map representing a relationship between the d-axis current command final value Id and the correction coefficient and calculates the corrected q-axis current command value Iq by multiplying and dividing the q-axis current command value Iq* by a correction coefficient corresponding to the d-axis current command final value Id**. As a result, the required torque can be appropriately realized regardless of the limitation of the d-axis current command value Id*. The third embodiment may be combined with the second embodiment described above.

Other Embodiments (a) The motor control amount in the present disclosure is not limited to the product of the voltage amplitude of the voltage command and the rotation speed of the motor, and an amount proportional to the product or an amount having a positive correlation may be used. Any value that reflects the shape of the sine wave voltage can be used as the motor control amount.

(b) The field-weakening control according to the present disclosure may be used in combination with other field-weakening controls disclosed in JP 2007-116849 A (US 2007/0107973) and the like as long as there is no interference or contradiction in operation. The disclosure of which is incorporated herein by reference.

Figure 2:
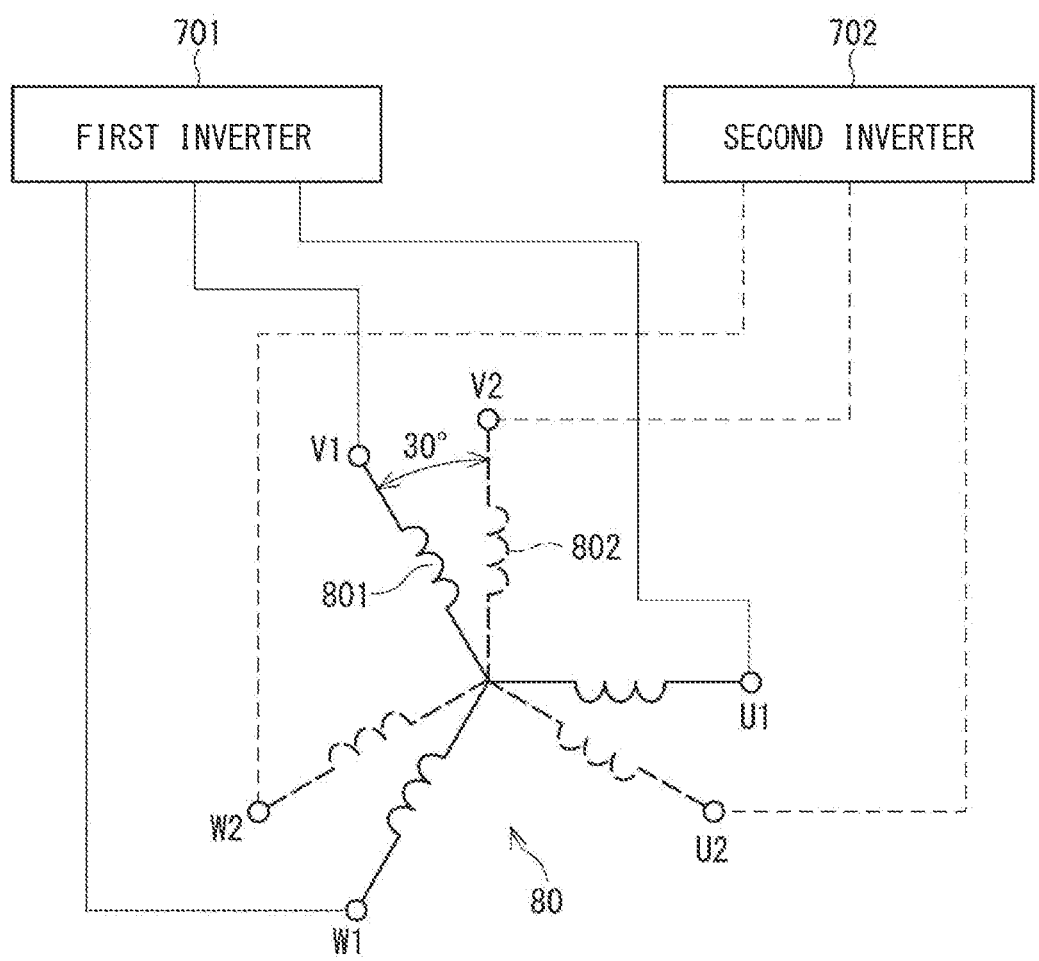
FIG. 2 is a schematic diagram showing a configuration of a double winding motor.

(c) The motor to be controlled may be a multi-winding motor having three or more sets of windings, in addition to the double winding motor shown in FIG. 2. The motor control device may be applied to a motor drive system provided with three or more inverter systems corresponding to three or more winding sets. In a multiple-system motor drive system, the motor control device includes multiple current controllers 27 and 28 and multiple field-weakening controllers 40 corresponding to multiple inverters 70. Each of the plurality of field-weakening controllers 40 has a voltage amplitude command limiter 42. Also, the voltage amplitude command limit value Vamp*_lim is preferably set to the same value.

(E) The motor control device according to the present disclosure is not limited to the steering assist motor of the electric power steering device, but may be applied to a motor for other applications mounted on a vehicle or a motor of a system other than the vehicle.

The present disclosure should not be limited to the embodiment described above. Various other embodiments may be implemented without departing from the scope of the present disclosure.

The motor control device and the technique according to the present disclosure may be achieved by a dedicated computer provided by constituting a processor and a memory programmed to execute one or more functions embodied by a computer program. Alternatively, the motor control device and the technique according to the present disclosure may be achieved by a dedicated computer provided by constituting a processor with one or more dedicated hardware logic circuits. Alternatively, the more control device and the technique according to the present disclosure may be achieved using one or more dedicated computers constituted by a combination of the processor and the memory programmed to execute one or more functions and the processor with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor control device applied to a motor drive system in which power from a DC power supply is converted into three-phase AC power by an inverter and supplied to a brushless motor for calculating a sine wave voltage command output to the inverter by vector control, comprising:
a torque command/current command converter configured to convert an input torque command into a d-axis current command value and a q-axis current command value;
a field-weakening controller configured to determine a d-axis current command correction value in a field-weakening control according to a voltage of the DC power supply and a voltage amplitude of the voltage command;
a d-axis current final value calculator configured to output a d-axis current command final value calculated using the d-axis current command value and the d-axis current command correction value; and
a current controller configured to perform a feedback control of the d-axis current command final value and the q-axis current command value;
wherein
the field-weakening controller has a voltage amplitude command limiter configured to limit a voltage amplitude command determined based on the voltage of the DC power supply, and
the voltage amplitude command limiter
calculates a product of the voltage amplitude of the voltage command and rotation speed of the motor as a motor state quantity, which is a time rate of change when a sine wave center voltage of the voltage command crosses from negative to positive, and
limits the voltage amplitude command to a voltage amplitude command limit value when the motor state quantity is equal to or greater than a predetermined limit start value.

2. The motor control device according to claim 1, wherein the voltage amplitude command limiter sets the voltage amplitude command limit value to a constant value when the motor state quantity is equal to or greater than the limit start value.

3. A motor control device applied to a motor drive system in which power from a DC power supply is converted into three-phase AC power by an inverter and supplied to a brushless motor for calculating a sine wave voltage command output to the inverter by vector control, comprising:
a torque command/current command converter configured to convert an input torque command into a d-axis current command value and a q-axis current command value;
a field-weakening controller configured to determine a d-axis current command correction value in a field-weakening control according to a voltage of the DC power supply and a voltage amplitude of the voltage command;
a d-axis current final value calculator configured to output a d-axis current command final value calculated using the d-axis current command value and the d-axis current command correction value; and
a current controller configured to perform a feedback control of the d-axis current command final value and the q-axis current command value;
wherein
the field-weakening controller has a voltage amplitude command limiter configured to limit a voltage amplitude command determined based on the voltage of the DC power supply, and
the voltage amplitude command limiter
calculates a product of the voltage amplitude of the voltage command and rotation speed of the motor as a motor state quantity, which is a time rate of change when a sine wave center voltage of the voltage command crosses from negative to positive, and
limits the voltage amplitude command to a voltage amplitude command limit value when the motor state quantity is equal to or greater than a predetermined limit start value, wherein
when the motor state quantity is equal to or greater than the limit start value, the voltage amplitude command limiter sets the voltage amplitude command limit value lower as the motor state quantity increases.

4. The motor control device according to claim 1, wherein the voltage amplitude command limiter variably sets the limit start value.

5. The motor control device according to claim 1, wherein the voltage amplitude command limiter determines the voltage amplitude command limit value according to the temperature of the motor detected by a temperature detector in addition to the motor state quantity.

6. The motor control device according to claim 1, further comprising,
a q-axis current command corrector configured to correct the q-axis current command value according to the d-axis current command final value, wherein
the motor is a motor having saliency.

7. The motor control device according to claim 1, wherein the motor is a multi-winding motor having a plurality sets of windings,
the motor control device is applied to a motor drive system provided with a plurality of inverters corresponding to a plurality sets of windings,
a plurality of the current controllers and a plurality of the field-weakening controllers corresponding to the plurality of inverters are provided, and
each of the plurality of field-weakening controllers has the voltage amplitude command limiter.

8. The motor control device according to claim 7, wherein the voltage amplitude command limit values in the plurality of voltage amplitude command limiters are set to the same value.

9. An electric power steering device, comprising:
a motor configured to output a steering assist torque; and
a motor control device according to claim 1, which controls driving of the motor.

10. An electric power steering device, comprising:
a motor configured to output a steering assist torque; and a motor control device configured to control driving of the motor, wherein the motor control device
is applied to a motor drive system in which power from a DC power supply is converted into three-phase AC power by an inverter and supplied to a brushless motor,
calculates a sine wave voltage command to be output to the inverter by vector control, and the motor control device includes
a torque command/current command converter configured to convert an input torque command into a d-axis current command value and a q-axis current command value,
a field-weakening controller configured to determine a d-axis current command correction value in a field-weakening control according to a voltage of the DC power supply and a voltage amplitude of the voltage command,
a d-axis current final value calculator configured to output a d-axis current command final value calculated using the d-axis current command value and the d-axis current command correction value, and
a current controller configured to perform a feedback control of the d-axis current command final value and the q-axis current command value, the field-weakening controller has a voltage amplitude command limiter configured to limit a voltage amplitude command determined based on the voltage of the DC power supply, and the voltage amplitude command limiter limits the voltage amplitude command to a voltage amplitude command limit value when a motor state quantity, which is a time rate of change when a sine wave center voltage of the voltage command crosses from negative to positive, is equal to or greater than a predetermined limit start value.

* * * * *